United States Patent
Xu

(10) Patent No.: US 11,531,120 B2
(45) Date of Patent: Dec. 20, 2022

(54) PICTURE PROCESSING METHOD AND RELATED DEVICE

(71) Applicant: Huawei Technologies Co., Ltd., Shenzhen (CN)

(72) Inventor: Tiansong Xu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 38 days.

(21) Appl. No.: 17/040,769

(22) PCT Filed: May 10, 2018

(86) PCT No.: PCT/CN2018/086355
§ 371 (c)(1),
(2) Date: Sep. 23, 2020

(87) PCT Pub. No.: WO2019/200636
PCT Pub. Date: Oct. 24, 2019

(65) Prior Publication Data
US 2021/0003718 A1  Jan. 7, 2021

(30) Foreign Application Priority Data
Apr. 17, 2018  (CN) .......................... 201810343195.8

(51) Int. Cl.
*G06T 11/60* (2006.01)
*G01S 19/51* (2010.01)
(Continued)

(52) U.S. Cl.
CPC .............. *G01S 19/51* (2013.01); *G01S 19/45* (2013.01); *G06F 16/29* (2019.01); *G06T 11/60* (2013.01)

(58) Field of Classification Search
CPC ........... G01S 19/52; G06T 11/60; G06F 16/29
(Continued)

(56) References Cited

U.S. PATENT DOCUMENTS
2011/0292231 A1  12/2011  Winters
2012/0078898 A1  3/2012  Kononenko et al.
(Continued)

FOREIGN PATENT DOCUMENTS
CN  101271153 A  9/2008
CN  103368984 A  10/2013
(Continued)

OTHER PUBLICATIONS

CIPA DC-008-Translation-2010, "Exchangeable image file format for digital still cameras: Exif Version 2.3," Established on Apr. 26, 2010, CameraandImaging Products Association, 190 pages.

*Primary Examiner* — Thomas J Lett
(74) *Attorney, Agent, or Firm* — Conley Rose, P.C.

(57) ABSTRACT

Embodiments of this application disclose a picture processing method, including: when a copy instruction is detected, obtaining positioning information included in a picture; modifying the positioning information in a preset information modification manner; and copying the picture whose positioning information is modified. The embodiments of this application further disclose a picture processing apparatus, a device, and a storage medium. According to the embodiments of this application, user privacy can be better protected, and information security can be improved.

21 Claims, 10 Drawing Sheets

(51) Int. Cl.
*G06F 16/29* (2019.01)
*G01S 19/45* (2010.01)

(58) Field of Classification Search
USPC .................................................. 455/456.1
See application file for complete search history.

(56) References Cited

U.S. PATENT DOCUMENTS

| | | |
|---|---|---|
| 2014/0222809 A1 | 8/2014 | Hochmuth et al. |
| 2015/0121535 A1* | 4/2015 | Fiss .................. H04N 1/32101 726/26 |
| 2016/0210369 A1 | 7/2016 | Johnson |
| 2016/0265935 A1 | 9/2016 | Ma |
| 2016/0283743 A1 | 9/2016 | Rueger et al. |
| 2017/0116224 A1 | 4/2017 | Qi et al. |
| 2017/0372501 A1 | 12/2017 | Ishimatsu |

FOREIGN PATENT DOCUMENTS

| | | |
|---|---|---|
| CN | 104596523 A | 5/2015 |
| CN | 105528372 A | 4/2016 |
| CN | 106202327 A | 12/2016 |
| CN | 106373079 A | 2/2017 |
| CN | 107818099 A | 3/2018 |
| CN | 107889070 A | 4/2018 |
| EP | 1998260 A1 | 12/2008 |
| JP | 4448814 B2 | 4/2010 |
| JP | 2014192543 A | 10/2014 |

* cited by examiner

| Sequence number | Field |
|---|---|
| 1 | Longitude |
| 2 | Latitude |
| 3 | East/West longitude identifier |
| 4 | South/North latitude identifier |

FIG. 5

| Sequence number | Field |
|---|---|
| 1 | Place name 1 |
| 2 | Longitude corresponding to the place name 1 |
| 3 | Latitude corresponding to the place name 1 |
| 4 | Place name 2 |
| 5 | Longitude corresponding to the place name 2 |
| 6 | Latitude corresponding to the place name 2 |

FIG. 6

| Term | Value before modification | | Value after modification | |
|---|---|---|---|---|
| | Readable value | Data segment in a file | Readable value | Data segment in a file |
| North or south latitude | N | 4E 00 | N | 4E 00 |
| Latitude | 118°46'26.9004" | 00 00 00 76 00 00 00 01 00<br>00 00 2E 00 00 00 01 00 01<br>06 B3 00 00 09 C4 | 118°46'43" | 00 00 00 76 00 00 00 01 00<br>00 00 2E 00 00 00 01 00 00<br>00 2B 00 00 00 01 |
| East or west longitude | E | 45 00 | E | 45 00 |
| Longitude | 31°59'1.3164" | 00 00 00 1F 00 00 00 01 00<br>00 00 3B 00 00 00 01 07 D8<br>AA BF 05 F5 E1 00 | 32°02'38" | 00 00 00 20 00 00 00 01 00<br>00 00 02 00 00 00 01 00 00<br>00 26 00 00 00 01 |
| Reference altitude | 0 | 00 | | |
| Altitude | 38 | 00 00 00 26 00 00 00 01 | | |

FIG. 9

Settings for sharing a copied picture

When the copied picture including
GPS location information is shared:

Reminder me: ◯ Yes  ◯ No

Height information: ☐ Delete  ☐ Retain

Location information: ☐ Delete  ☐ Retain

☐ Random offset  | 38 |  meter(s)

PICTURE PROCESSING METHOD AND RELATED DEVICE

TECHNICAL FIELD

CROSS-REFERENCE TO RELATED APPLICATIONS

This application is a National Stage of International Patent Application No. PCT/CN2018/086355, filed on May 10, 2018, which claims priority to Chinese Patent Application No. 201810343195.8, filed on Apr. 17, 2018. Both of the aforementioned applications are hereby incorporated by reference in their entireties.

BACKGROUND

With rapid popularization of the mobile internet and enhancement of a photographing function of user equipment, for example, a mobile phone, a user may use the user equipment to photograph anytime and anywhere to record life. Most user equipments have built-in global positioning system (Global Positioning System, GPS) functions. When the user equipment is used for photographing, current GPS location data may be written to a photographed picture in an exchangeable image file format (Exchangeable Image File Format. EXIF), and both the GPS location data and the picture are stored. However, when the picture with the GPS location data is copied to another location or is copied and shared to a network, the GPS location data is also shared. However, the user does not realize that private location information of the user has been exposed. Consequently, a track of the user may be maliciously used, and personal privacy cannot be protected.

SUMMARY

Embodiments of this application provide a picture processing method and a related device, to better protect user privacy and improve information security.

According to a first aspect, an embodiment of this application provides a picture processing method, including: when a copy instruction is detected, first obtaining positioning information included in a picture; then, modifying the positioning information in a preset information modification manner; and finally, copying the picture whose location information is modified. By modifying the positioning information included in the picture, after the picture is copied, another user cannot learn of an accurate geographical location at which the picture is photographed, thereby avoiding user privacy disclosure.

In a possible design, optional geographical information corresponding to the positioning information may be displayed; and the positioning information is replaced with selected optional geographical information based on a selection instruction entered by a user to perform modification. Modified GPS location information cannot be used to locate a specific location of the user. This prevents privacy information of the user from being disclosed and being maliciously used, and improves information security.

In another possible design, user equipment may send the positioning information to a server. After receiving the positioning information, the server queries optional geographical information, and sends the optional geographical information to the user equipment. In this way, the optional geographical information is queried from the server.

In another possible design, the GPS location information may be associated with the optional geographical information in advance, and associated information is stored on the user equipment, or data in a database on the server may be stored on the user equipment. After obtaining the GPS location information, the user equipment may directly locally query the optional geographical information corresponding to the positioning information.

In another possible design, the user equipment may display prompt information. The prompt information may be displayed in an interaction screen by using a prompt dialog box. If it is detected that EXIF information includes the GPS location information, the prompt dialog box is automatically displayed to prompt the user to modify the GPS location information in the prompt dialog box, so as to prevent information disclosure.

In another possible design, content in the prompt dialog box may include at least one of a prompt title, warning prompt information, a first map location mark, longitude, latitude and altitude information, an altitude information option, a location information processing option, a one-click clear option, an ok option, and a second map location mark.

In another possible design, a local map including the positioning information may be displayed; then, a location selected by a user on the local map is received; and geographical information corresponding to the location is used as modified positioning information. The modified GPS location information cannot be used to locate a specific location of the user. This prevents privacy information of the user from being disclosed and being maliciously used, and improves information security.

In another possible design, it may be determined that there is preset configuration information, and the positioning information is modified based on the preset configuration information. Modified GPS location information cannot be used to locate a specific location of the user. This prevents privacy information of the user from being disclosed and being maliciously used, and improves information security.

In another possible design, a first location point corresponding to the positioning information is first moved to a second location point along any direction based on a preset offset distance; and geographical information corresponding to the second location point is used as modified positioning information. In this way, the positioning information is modified.

In another possible design, geographical information entered by a user may be received; and the entered geographical information is used as modified location information. The modified GPS location information cannot be used to locate a specific location of the user. This prevents privacy information of the user from being disclosed and being maliciously used, and improves information security.

In another possible design, voice information entered by a user may be obtained; the voice information is identified to determine geographical information included in the voice information; and the geographical information is used as modified location information. The modified GPS location information cannot be used to locate a specific location of the user. This prevents privacy information of the user from being disclosed and being maliciously used, and improves information security.

In another possible design, a picture address in the copy instruction is obtained; exchangeable image file format EXIF information of the picture is read based on the picture address; and the position information is obtained from the EXIF information.

In another possible design, the picture is first copied to a temporary file; the modified positioning information is written to the temporary file, and both the temporary file and the modified positioning information is stored in a memory; and then the picture address in the copy instruction is modified to an address of the temporary file, to complete copying of the picture.

According to a second aspect, an embodiment of this application provides a picture processing apparatus. The picture processing apparatus is configured to implement the method and the function performed by the user equipment in the first aspect, and is implemented by hardware/software. The hardware/software of the picture processing apparatus includes units corresponding to the foregoing function.

According to a third aspect, this application provides user equipment, including a processor, a memory, and a communications bus, where the communications bus is configured to implement connection and communication between the processor and the memory, and the processor executes a program stored in the memory to implement the steps in the picture processing method according to the first aspect.

In a possible design, the user equipment provided in this application may include a corresponding module configured to perform an action of the user equipment in the foregoing method design. The module may be software and/or hardware.

According to a fourth aspect, this application provides a computer-readable storage medium, where the computer-readable storage medium stores an instruction, and when the instruction runs on a computer, the computer is enabled to perform the method in each aspect.

According to a fifth aspect, this application provides a computer program product including an instruction, where when the computer program product runs on a computer, the computer is enabled to perform the method in each aspect.

BRIEF DESCRIPTION OF DRAWINGS

To describe the technical solutions in the embodiments of this application or in the background more clearly, the following briefly describes the accompanying drawings required for describing the embodiments of this application or the background.

FIG. 5 is a schematic diagram of GPS location information according to an embodiment of this application:

FIG. 6 is a schematic diagram of an optional geographical name list according to an embodiment of this application;

FIG. 9 is a schematic diagram of another piece of GPS location information according to an embodiment of this application;

FIG. 11 is a schematic diagram of setting configuration information according to an embodiment of this application;

DESCRIPTION OF EMBODIMENTS

The following describes the embodiments of this application with reference to the accompanying drawings in the embodiments of this application.

Figure 1:
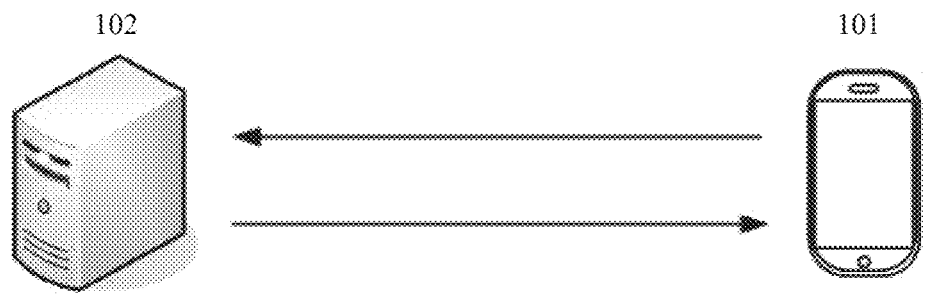
FIG. 1 is a schematic structural diagram of a picture processing system according to an embodiment of this application.

FIG. 1 is a schematic structural diagram of a picture processing system according to an embodiment of this application. The picture processing system includes user equipment 101 and a server 102. The user equipment 101 is mainly configured to read positioning information (for example, GPS location information) included in a picture, and provide an interaction screen for a user. The user equipment 101 may be any device having a wireless transceiver function, may be a device providing a voice and/or data connection to the user, may be a computing device connected to a laptop computer, a desktop computer, or the like, or may be an independent device such as a personal digital assistant (Personal Digital Assistant, PDA). The user equipment may also be referred to as a system, a subscriber unit, a subscriber station, a mobile station, a mobile console, a remote station, an access point, a remote terminal, an access terminal, a user terminal, a user agent, or a user apparatus. The server 102 may be a location query server, and is mainly configured to query optional geographical information based on GPS location information reported by the user equipment, where an area represented by a geographical name in the optional geographical information includes a location point in a longitude range and a latitude range.

Figure 2:
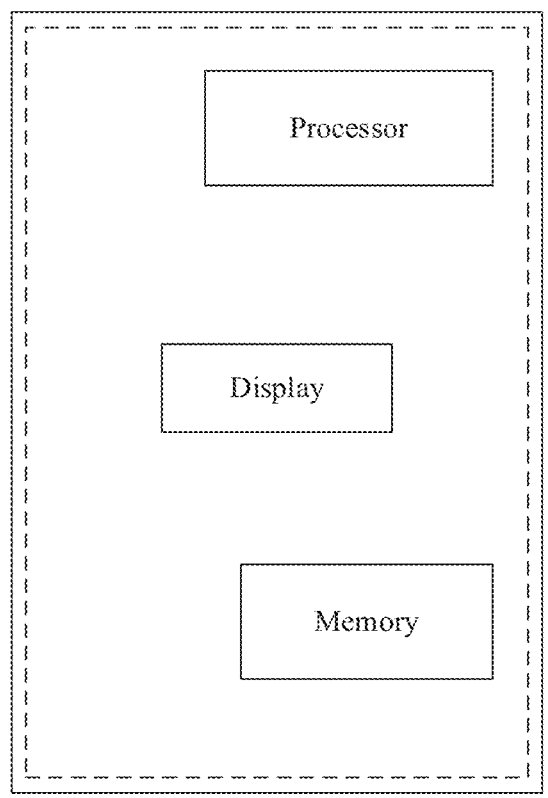
FIG. 2 is a schematic structural diagram of user equipment according to an embodiment of this application.

FIG. 2 is a schematic structural diagram of user equipment according to an embodiment of this application. The user equipment includes a processor, a display, and a memory. The processor is mainly configured to execute various instructions received by the user equipment. The memory is configured to store various data on the user equipment, for example, a file such as a picture. The display is configured to display an interaction screen, including receiving an instruction entered by a user, providing window display, and the like.

To resolve a problem that privacy is easily disclosed, the prior art provides the following several solutions:

In a first solution, by default, when a user shares a picture by using an instant messaging tool, compression processing is performed on the picture before the picture is sent, and EXIF information included in the picture is deleted, where the EXIF information includes image photographing time, image storage time, GPS location information of the photographed image, and the like. In this way, the GPS location information of the user is not disclosed with picture sharing, network traffic during picture sharing is reduced, and a sending speed of the picture is improved. However, compression processing reduces definition of the picture. If the user wants to improve definition of the shared picture, and selects to send the original picture with an original resolution, the GPS location information of the picture may also be sent without any prompt, and user privacy cannot be protected.

In a second solution, because the EXIF information included in the picture does not facilitate or affect a display effect of the picture, normally, most picture editing software may delete the EXIF information included in the picture file after the picture is edited and compressed. If the picture is edited and compressed before being sent, the GPS location information included in the picture is deleted, so that the GPS location information of the user is not disclosed, but this makes operations complex. In addition, most users are not aware that the picture includes the GPS location information, and do not further use picture editing software for processing. Therefore, there is still a risk that the GPS location information of the user is disclosed.

Figure 3:
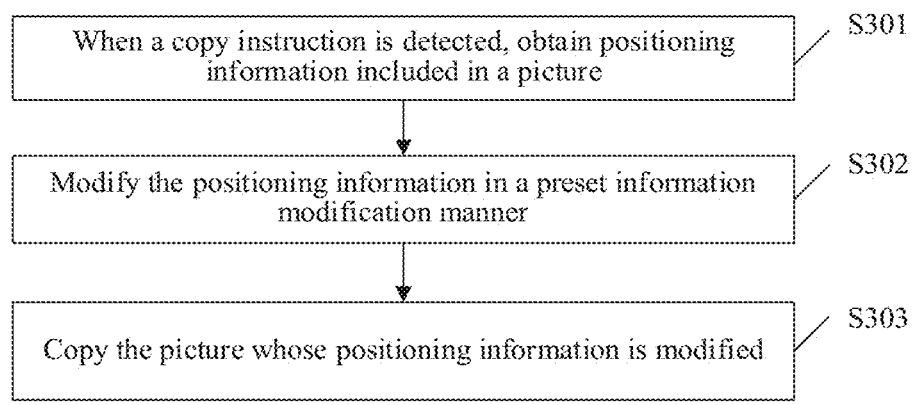
FIG. 3 is a schematic flowchart of a picture processing method according to an embodiment of this application.

According to the foregoing analysis, the foregoing solutions all use a manner of deleting the location information, but in an actual operation, the user usually forgets to delete, or it is inconvenient for the user to delete the location information to effectively protect user privacy information. For the foregoing technical problem, FIG. 3 is a schematic flowchart of a picture processing method according to an embodiment of this application. The method includes the following steps. S301: When a copy instruction is detected, obtain positioning information included in a picture. S302: Modify the positioning information in a preset information modification manner. S303: Copy the picture whose positioning information is modified. In this embodiment of this application, when it is detected that the picture is to be copied, the positioning information included in the picture is modified. After the picture is copied, another user cannot learn of an accurate geographical location at which the picture is photographed, thereby avoiding user privacy disclosure. The following describes an implementation process of this solution by using specific embodiments.

Figure 4:
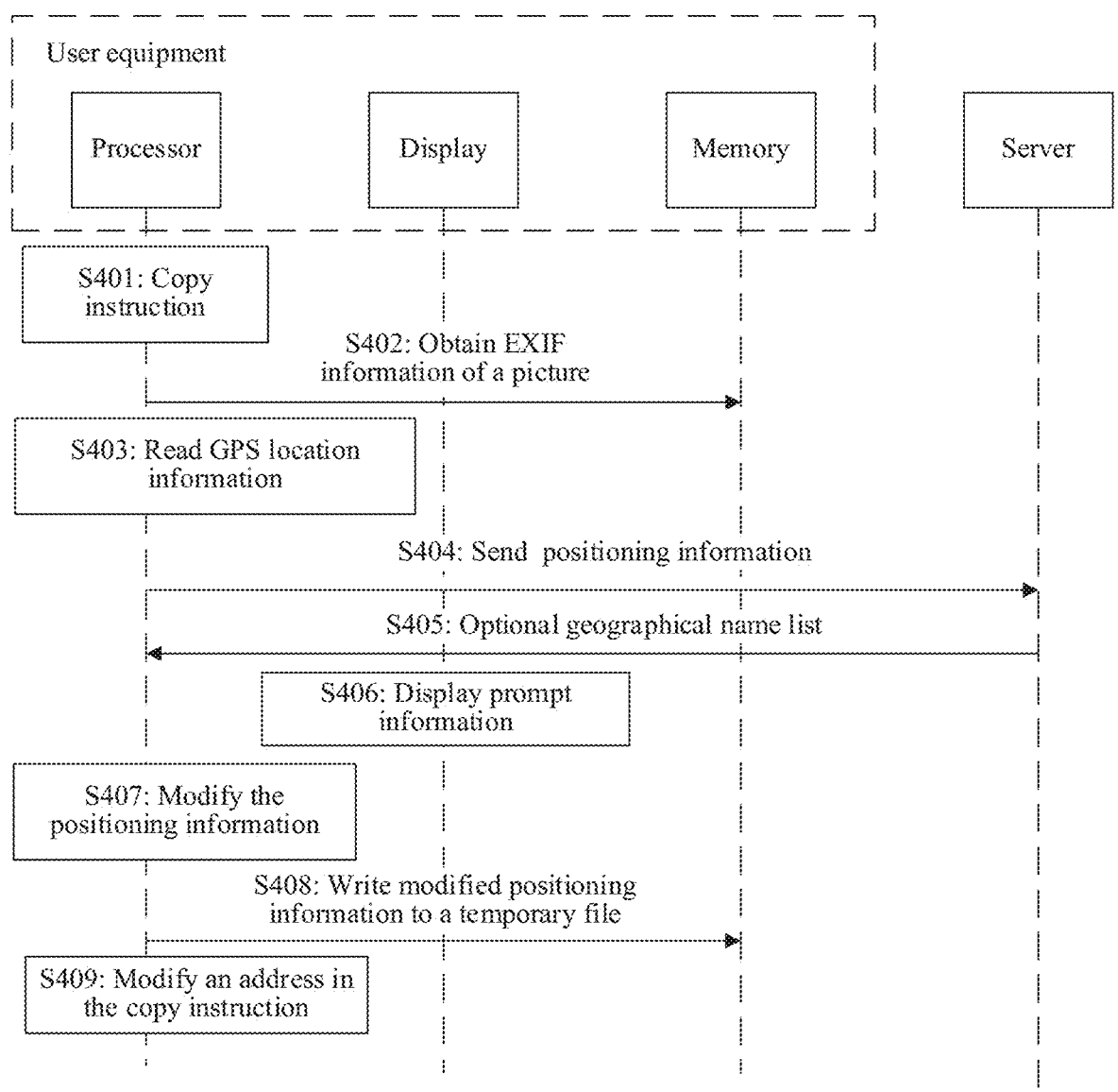
FIG. 4 is a schematic flowchart of another picture processing method according to an embodiment of this application.

FIG. 4 is a schematic flowchart of a picture processing method used for user equipment according to an embodiment of this application. The user equipment includes a processor, a display, and a memory. As shown in the figure, steps in this embodiment of this application include at least the following steps.

S401: The processor executes a copy instruction, where the copy instruction may be triggered by a user.

In specific implementation, the processor may detect whether a local picture is to be copied to another location or is to be copied to a network, and when detecting that the picture is to be copied to the another location or is to be copied to the network, the processor executes the copy instruction triggered by the user. A source of the picture includes but is not limited to a photo library, an SD card, or another storage location. Specifically, how to detect that the picture is to be copied varies with operating systems of different user equipments. Details are not described in this embodiment of this application.

S402: The processor obtains a picture address in the copy instruction, and reads, from the memory based on the picture address in the copy instruction, EXIF information included in a picture.

In specific implementation, when it is detected that the picture is to be copied to the another location or is to be copied to the network, the processor reads, based on a picture format of the picture, the EXIF information included in the picture. Storage locations of the EXIF information in the picture file may be different for different picture formats, but different picture formats uses same protocol formats of the EXIF information. The EXIF information includes a device model, picture photographing time, picture storage time, GPS location information of the photographed picture, and the like.

S403: The processor obtains positioning information from the EXIF information, where the positioning information may be GPS location information.

In specific implementation, the processor reads, from the memory, the EXIF information included in the picture, and then parses the positioning information in the EXIF information. If the positioning information is read from the EXIF information, S404 is performed; or if the positioning information fails to be read, the processor continues to execute the copy instruction triggered by the user. In a standard protocol format of the EXIF information, North or South Latitude in the GPS location information indicates south latitude or north latitude indication information, Latitude indicates a latitude value, East or West Longitude indicates east longitude or west longitude indication information, and Longitude indicates a longitude value, Altitude reference and Altitude indicate a sea level height. If at least one of the south latitude or north latitude indication information, the latitude value, the east longitude or west longitude indication information, the longitude value, and the altitude is obtained from the EXIF information, it is determined that the to-be-copied picture includes the GPS location information. FIG. 5 is a schematic diagram of GPS location information according to an embodiment of this application. The GPS location information includes a longitude value, a latitude value, an east longitude or west longitude identifier, and a south latitude or north latitude identifier.

S404: The processor sends the positioning information to a server, where the positioning information is used to instruct the server to query optional geographical information, where the optional geographical information may be an optional geographical name list, and the optional geographical name list may include at least one geographical name.

FIG. 6 is a schematic diagram of an optional geographical name list according to an embodiment of this application. The optional geographical name list includes: a geographical name 1, a longitude value corresponding to the geographical name 1, and a latitude value corresponding to the geographical name 1, and a geographical name 2, a longitude value corresponding to the geographical name 2, and a latitude value corresponding to the geographical name 2.

S405: The server may obtain, from a database based on the positioning information, optional geographical information corresponding to the positioning information, and return the optional geographical information to the processor. In addition, the server may further determine, based on the positioning information, a local map including the positioning information, and return the local map to the user equipment.

It should be noted that, in S404 and S405, the optional geographical information corresponding to the positioning information is queried from the server. In this embodiment of this application, the GPS location information may be further associated with the optional geographical information in advance, and associated information is stored on the user equipment, or data in the database on the server may be stored on the user equipment. After obtaining the GPS location information, the user equipment may directly locally query the optional geographical information corresponding to the positioning information.

S406: The display displays prompt information, where the prompt information includes the optional geographical information, and the prompt information is used to instruct the user to modify the positioning information of the picture. The prompt information may be displayed in an interaction screen by using a prompt dialog box.

In specific implementation, after the optional geographical information corresponding to the positioning information is found, the prompt dialog box may be displayed on the interaction screen. Content in the prompt dialog box may include at least one of a prompt title, warning prompt information, a map location mark 1, longitude, latitude and altitude information, an altitude information option, a location information processing option, a one-click clear option, an ok option, and a map location mark 2.

The prompt title is used to display a main purpose of a current window. The warning prompt information is used to display description prompting that a picture currently being copied or shared contains sensitive GPS geographical location information. The map location mark 1 is used to display the local map including the GPS location information, mark a first location point on the map based on the GPS location information, and display address text information corresponding to the first location point. The longitude information, latitude information, and altitude information display, in text format, original information data items read from the EXIF information. When the altitude information option is selected, the altitude information can be deleted or the height information can be modified in a text box by the user. The location information processing option is used to display the optional geographical name list, and allows the user to select another city, province, and country. Each geographical name in the optional geographical name list corresponds to one type of longitude and latitude information. The user may alternatively clear the optional geographical name list, so that the geographical name is not displayed in the prompt dialog box. The one-click clear option is used to directly delete all GPS location information in the picture. When the ok option is clicked, the picture is copied to a temporary file, and the GPS location information is modified. The picture address in the copy instruction is modified to a saved address of the temporary file, and then an original sharing and copy process continues. The map location mark 2 is used to display a local map including modified GPS location information, mark a second location point on the local map based on the modified GPS location information, and display address text information corresponding to the second location point.

Figure 7:
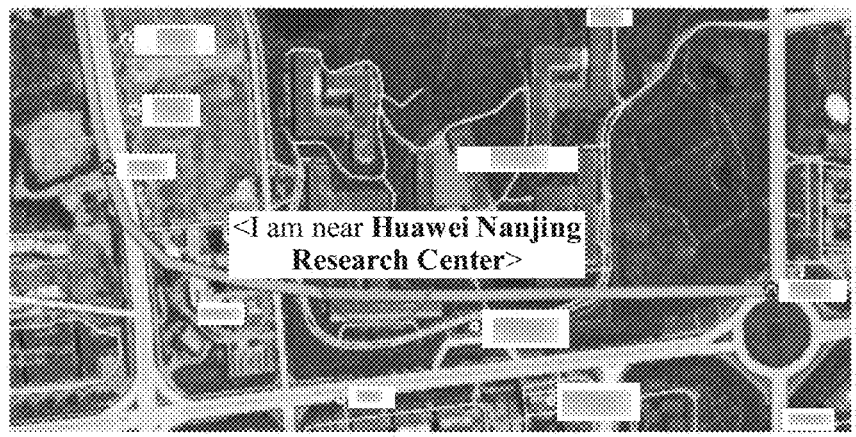
FIG. 7 is a schematic diagram of a prompt dialog box according to an embodiment of this application.

FIG. 7 is a schematic diagram of a prompt dialog box according to an embodiment of this application. Content of the prompt dialog box includes the title "reminder" and the warning prompt information "The shared picture contains your precise location information!" The map location mark 1 is "N5-5F, Huawei Nanjing Research Center". The longitude information, latitude information, and altitude information are as follows: "longitude: 118° 46'26.9004", east longitude; latitude: 31° 59'1.3164", north latitude: and height: altitude 38 meters". The altitude information includes two options: "delete" and "38 meters". The location information includes six options: "Huawei Base", "Yuhua District", "Nanjing City", "Jiangsu Province", "China", and "Clear". There are further two options: "one-click clear" and "ok". In addition, the local map including the positioning information may be further displayed in the prompt dialog box.

S407: The processor modifies the positioning information in the following several optional manners.

In a first optional manner, the positioning information may be replaced with selected optional geographical information based on a selection instruction entered by the user to perform modification. For example, as shown in FIG. 7, the optional geographical information list includes "Huawei Base", "Yuhua District", "Nanjing City", "Jiangsu Province", and "China". The user may select any one of the five options "Huawei Base", "Yuhua District", "Nanjing City", "Jiangsu Province", and "China" in the location information. If the user selects "Nanjing City", after the user clicks "ok", "Nanjing City" may be used to replace the map location mark 1 "N5-5F, Huawei Nanjing Research Center" and a modified map location mark 2 "Nanjing City" is displayed on the local map. In addition, the user may alternatively select "clear" in the location information option, to display no location information. The user may alternatively select "delete" in the height information option to display no height information, or re-enter a value in the height information option that is different from the original height "38 meters". Alternatively, the user may click the "one-click clear" option to delete all the GPS location information from the picture.

Figure 8:
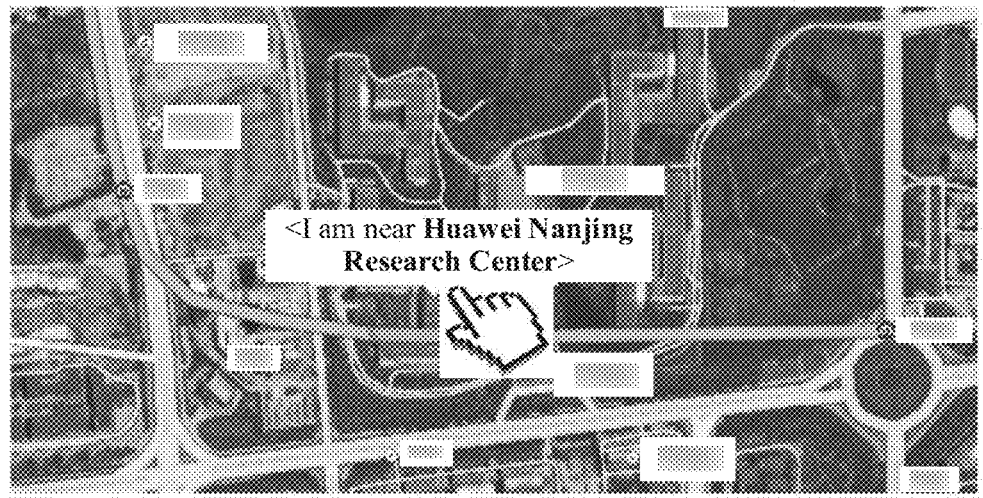
FIG. 8 is a schematic diagram of another prompt dialog box according to an embodiment of this application.

In a second optional manner, the local map including the positioning information may be displayed; a location selected by the user on the local map is received; and geographical information corresponding to the location is used as the modified positioning information. For example, as shown in FIG. 8, a selected track location is "N5-5F, Huawei Nanjing Research Center", and the track location is the GPS location information before modification. The user may randomly select a location on the displayed local map, and longitude and latitude information corresponding to the location is used as modified GPS location information.

It should be noted that both the first optional manner and the second optional manner may be used, and the positioning information included in the picture is modified in the prompt dialog box.

As shown in FIG. 9, the original location information of the picture is "N5-5F, Huawei Nanjing Research Center", and the corresponding longitude information, latitude information, and altitude information are as follows: "longitude: 118° 46'26.9004", east longitude, latitude: 31° 59'1.3164", north latitude, and height: altitude 38 meters". If the user selects to delete the height information, a selected city name is "Nanjing City", and longitude and latitude information corresponding to "Nanjing City" is 32° 02'38" north latitude and 118° 46'43" east longitude, data segments of the EXIF information before modification are clearly different from data segments of modified EXIF information of the picture.

S408: The processor copies the picture to a temporary file, writes the modified positioning information to the temporary file, and stores both the temporary file and the modified positioning information in the memory.

S409: The processor modifies the picture address in the copy instruction to an address of the temporary file, and continues to execute the original picture copy instruction.

In this embodiment of this application, when the copy instruction is detected, the EXIF information included in the picture is read. If it is detected that the EXIF information includes the GPS location information, the prompt dialog box is automatically displayed to remind the user to modify the GPS location information in the prompt dialog box. The modified GPS location information cannot be used to locate a specific location of the user. This prevents privacy information of the user from being disclosed and being maliciously used, and improves information security.

Figure 10:
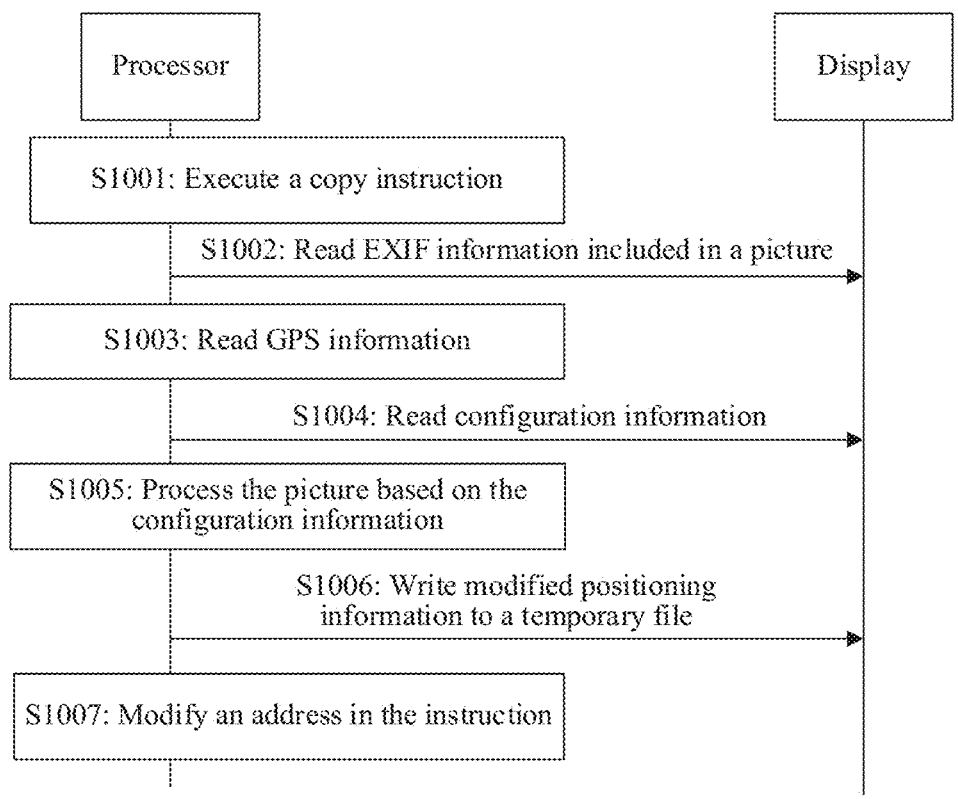
FIG. 10 is a schematic flowchart of another picture processing method according to an embodiment of this application.

FIG. 10 is a schematic flowchart of another picture processing method according to an embodiment of this application. As shown in the figure, steps in this embodiment of this application include at least the following steps.

S1001: A processor executes a copy instruction triggered by a user. This step is the same as S401 in the foregoing embodiment, and details are not described in this embodiment of this application.

S1002: The processor reads, from a memory based on a picture address in the copy instruction, EXIF information included in a picture. This step is the same as S402 in the foregoing embodiment, and details are not described in this embodiment of this application.

S1003: The processor obtains positioning information from the EXIF information, where the positioning information may be GPS location information. This step is the same as S403 in the foregoing embodiment, and details are not described in this embodiment of this application.

S1004: The processor determines that there is preset configuration information, and reads the preset configuration information from the memory.

The configuration information may be preconfigured by the user in system setting. FIG. 11 is a schematic diagram of setting configuration information according to an embodiment of this application. The configuration information includes: a "remind me" option, indicating that if the user selects "yes", the manner in the foregoing embodiment is used, in other words, after the GPS location information of the picture is obtained, a prompt dialog box is displayed to prompt the user to modify the GPS location information, or if the user selects "no", the GPS location information is processed by using this embodiment. A "height information" option indicates that if the user selects "delete", height information included in the picture is deleted, or if the user selects "retain", the height information included in the picture is retained. A "location information" option indicates that if the user selects "delete", the GPS location information included in the picture is deleted, or if the user selects "retain", the GPS location information included in the picture is not processed. If the user selects "random offset", after reading the configuration information from the memory, the processor performs random offset processing on the GPS location information included in the picture. In addition, an offset distance may be further set. S1005: The processor modifies the positioning information based on the preset configuration information, where the preset configuration information includes at least one of the offset distance, an offset height, and an offset location.

In specific implementation, if the user selects the "random offset" in a "location information" option, a first location point corresponding to the positioning information may be moved to a second location point in any direction based on the preset offset distance, and geographical information corresponding to the second location point is used as the modified positioning information. Alternatively, if the user selects the "offset location", the first location point corresponding to the positioning information may be moved to the preset offset location, and geographical information corresponding to the offset location is used as the modified positioning information.

S1006: The processor copies the picture to a temporary file, writes the modified positioning information to the temporary file, and stores both the temporary file and the modified positioning information in the memory.

S1007: The processor modifies the picture address in the copy instruction to an address of the temporary file, and continues to execute the original picture copy instruction.

A difference between this embodiment of this application and the foregoing embodiment lies in that a prompt dialog box does not need to be displayed to remind the user to modify the GPS location information. In this embodiment of this application, when the copy instruction is detected, the EXIF information included in the picture is read. If it is detected that the EXIF information includes the GPS location information, the GPS location information is randomly offset based on the configuration information. The modified GPS location information cannot be used to locate a specific location of the user. This prevents privacy information of the user from being disclosed and being maliciously used, and improves information security. In this way, the user does not need to perform selection and modification each time when performing copying or sharing. Instead, after the user uniformly sets the GPS location information, user equipment can perform automatic modification based on setting. This further improves usability.

It should be noted that, in addition to the foregoing several manners of modifying the positioning information, this embodiment of this application may further include but is not limited to the following several optional manners: In a first optional manner, geographical information entered by a user is received; and the entered geographical information is used as the modified positioning information. In a second optional manner, voice information entered by a user may be obtained; the voice information is identified to determine geographical information included in the voice information; and the geographical information is used as the modified positioning information. For example, when it is detected that positioning information needs to be modified, the voice information sent by the user is received by using a microphone. When the user gives a sound "Beijing", if an original positioning information is "Nanjing", "Nanjing" may be modified to "Beijing".

Figure 12:
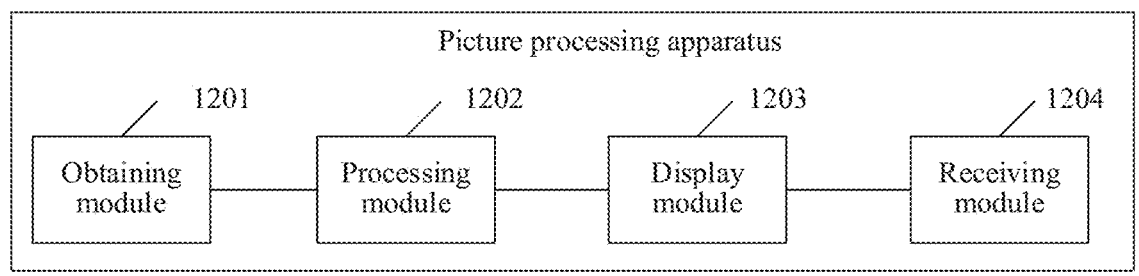
FIG. 12 is a schematic structural diagram of a picture processing apparatus according to an embodiment of this application.

FIG. 12 is a schematic structural diagram of a picture processing apparatus according to an embodiment of this application. As shown in the figure, the apparatus in this embodiment of this application includes an obtaining module 1201, a processing module 1202, a display module 1203, and a receiving module 1204.

The obtaining module 1201 is configured to: when a copy instruction is detected, obtain positioning information included in a picture.

The processing module 1202 is configured to modify the positioning information in a preset information modification manner.

The processing module 1202 is further configured to copy the picture whose positioning information is modified.

Optionally, the display module 1203 is configured to display optional geographical information corresponding to the positioning information.

The processing module 1202 is further configured to replace the positioning information with selected optional geographical information based on a selection instruction entered by a user to perform modification.

The optional geographical information is provided after a server performs query based on the received positioning information.

The processing module 1202 is further configured to: determine that there is preset configuration information; and modify the positioning information based on the preset configuration information.

Optionally, the processing module 1202 is further configured to: move, along any direction based on a preset offset distance, a first location point corresponding to the positioning information to a second location point; and use geographical information corresponding to the second location point as the modified positioning information.

Optionally, the display module 1203 is configured to display a local map including the positioning information;

the receiving module 1204 is configured to receive a location selected by the user on the local map; and the processing module 1202 is further configured to use geographical information corresponding to the location as the modified positioning information.

Optionally, the obtaining module 1201 is further configured to receive geographical information entered by a user; and the processing module 1202 is further configured to use the entered geographical information as the modified positioning information.

Optionally, the obtaining module 1201 is further configured to obtain voice information entered by a user; and the processing module 1202 is further configured to: identify the voice information to determine geographical information included in the voice information; and use the geographical information as the modified positioning information.

Optionally, the obtaining module 1201 is further configured to obtain a picture address in the copy instruction; read exchangeable image file format EXIF information of the picture based on the picture address; and obtain the positioning information from the EXIF information.

Optionally, the processing module 1202 is further configured to: copy the picture to a temporary file; write the modified positioning information to the temporary file; and modify the address picture in the copy instruction to an address of the temporary file.

It should be noted that, for implementation of modules, refer to corresponding descriptions of the method embodiments shown in FIG. 3, FIG. 4, and FIG. 10. The modules perform the methods and the functions performed by the user equipment in the foregoing embodiments.

Figure 13:
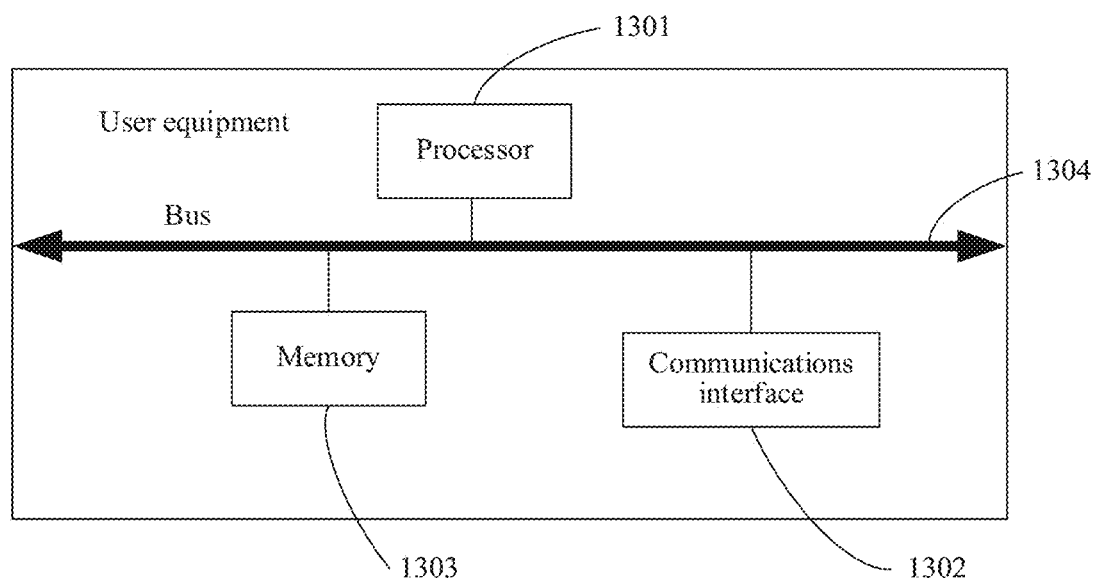
FIG. 13 is a schematic structural diagram of user equipment according to this application.

FIG. 13 is a schematic structural diagram of user equipment according to this application. The user equipment shown in FIG. 13 and the user equipment shown in FIG. 2 belong to a same device. FIG. 13 and FIG. 2 show a structure of the user equipment in different manners. As shown in FIG. 13, the user equipment may include at least one processor 1301, at least one communications interface 1302, at least one memory 1303, and at least one communications bus 1304.

The processor 1301 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the digital signal processor and a microprocessor. The communications bus 1304 may be a peripheral component interconnect PCI bus, an extended industry standard architecture EISA bus, or the like. The bus may be classified into an address bus, a data bus, a control bus, and the like. For ease of representation, only one thick line is used to represent the bus in FIG. 13, but this does not mean that there is only one bus or only one type of bus. The communications bus 1304 is configured to implement connection and communication between these components. The communications interface 1302 in the device in this embodiment of this application is configured to perform signaling or data communication with another node device. The memory 1303 may include a volatile memory, for example, a nonvolatile random access memory (NVRAM), a phase change random access memory (PCRAM), or a magnetoresistive random access memory (MRAM). The memory 1303 may further include a nonvolatile memory, for example, at least one magnetic disk storage component, an electrically erasable programmable read-only memory (EEPROM), a flash memory component such as a NOR flash memory (NOR flash memory) or a NAND flash memory, or a semiconductor component such as a solid-state drive (SSD). Optionally, the memory 1303 may alternatively be at least one storage apparatus far away from the processor 1301. The memory 1303 stores a group of program code, and the processor 1301 executes a program that is in the memory 1303 and that is executed by the user equipment.

The processor 1301 is configured to: when a copy instruction is detected, obtain positioning information included in a picture:

modify the positioning information in a preset information modification manner; and copy the picture whose positioning information is modified.

Optionally, the processor 1301 is further configured to perform the following operations:

displaying optional geographical information corresponding to the positioning information; and replacing the positioning information with selected optional geographical information based on a selection instruction entered by a user to perform modification.

The optional geographical information is provided after a server performs query based on the received positioning information.

Optionally, the processor 1301 is further configured to perform the following operations:

determining that there is preset configuration information; and modifying the positioning information based on the preset configuration information.

Optionally, the processor 1301 is further configured to perform the following operations:

moving, along any direction based on the preset offset distance, a first location point corresponding to the positioning information to a second location point; and using geographical information corresponding to the second location point as the modified positioning information.

Optionally, the processor 1301 is further configured to perform the following operations:

displaying a local map including the positioning information;

receiving a location selected by the user on the local map; and using geographical information corresponding to the location as the modified positioning information.

Optionally, the processor 1301 is further configured to perform the following operations:

receiving geographical information entered by a user; and using the entered geographical information as the modified positioning information.

Optionally, the processor 1301 is further configured to perform the following operations:

obtaining voice information entered by a user;

identifying the voice information to determine geographical information included in the voice information; and using the geographical information as the modified positioning information.

Optionally, the processor 1301 is further configured to perform the following operations:

obtaining a picture address in the copy instruction;

reading exchangeable image file format EXIF information of the picture based on the picture address; and obtaining the positioning information from the EXIF information.

Optionally, the processor 1301 is further configured to perform the following operations:

copying the picture to a temporary file;

writing the modified positioning information to the temporary file; and modifying the picture address in the copy instruction to an address of the temporary file.

Further, the processor may further cooperate with the memory and the communications interface to perform operations of the user equipment in the foregoing embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The objectives, technical solutions, and beneficial effects of this application are further described in detail in the foregoing specific implementations. Any modification, equivalent replacement, or improvement made without departing from the spirit and principle of this application shall fall within the protection scope of this application.

What is claimed is:

1. A picture processing method, comprising:

detecting an instruction for copying a first picture, wherein the first picture is stored at a first memory address and comprises a first exchange image file format (EXIF) information including a first positioning information;

obtaining the first EXIF information, modifying the first positioning information in a preset manner to obtain second positioning information to obtain a second picture, wherein the second picture comprises a second EXIF information, the second EXIF information comprises the second positioning information; and copying the second picture, wherein after copying the second picture, the first picture remains stored at the first memory address.

2. The picture processing method of claim 1, further comprising displaying optional geographical information corresponding to the first positioning information, wherein modifying the first positioning information comprises replacing the first positioning information with geographical information based on a selection instruction input.

3. The picture processing method of claim 2, further comprising receiving the optional geographical information from a server.

4. The picture processing method of claim 1, further comprising:

determining that there is preset configuration information; and modifying the first positioning information based on the preset configuration information.

5. The picture processing method of claim 4, further comprising:

moving a first location point corresponding to the first positioning information to a second location point along a direction based on a preset offset distance; and using geographical information corresponding to the second location point as the second positioning information.

6. The picture processing method of claim 1, further comprising:

displaying a local map comprising the first positioning information;

receiving user input selecting a location on the local map; and using geographical information corresponding to the location as the second positioning information.

7. The picture processing method of claim 1, further comprising:

receiving geographical information from a user; and using the geographical information as the second positioning information.

8. The picture processing method of claim 1, further comprising:

obtaining voice information from a user;

identifying geographical information in the voice information; and using the geographical information as the second positioning information.

9. The picture processing method of claim 1, further comprising:

parsing the first positioning information;

determining that the first picture includes global positioning system (GPS) information when the first positioning information comprises a latitude value, longitude value, or altitude value;

querying stored geographical information; and determining that the GPS information is associated with geographical information; and modifying the first positioning information in a preset manner to obtain the second positioning information; or prompting for a second instruction;

detecting a second instruction for modifying the first positioning information; and modifying the first positioning information in response to the second instruction to obtain the second positioning information.

10. The picture processing method of claim 1, wherein and the first positioning information is any GPS location, and wherein the preset manner is deleting any GPS location of the first picture.

11. The picture processing method of claim 1, wherein the second picture is stored at a second memory address, and wherein the method further comprises executing, using the second memory address, the instruction.

12. User equipment comprising:
a processor; and
a memory coupled to the processor and storing instructions that, when executed by the processor, cause the user equipment to be configured to:
  detect an instruction for copying a first picture stored at a first memory address and comprises a first exchange image file format (EXIF) information including a first positioning information;
  obtain the first EXIF information;
  modify the first positioning information in a preset manner into second positioning information to obtain a second picture, wherein the seocnd picture comprises a second EXIF information, the second EXIF information comprises the second positioning information; and
  copy the second picture comprising the second positioning information,
  wherein after copying the second picture, the first picture remains stored at the first memory address.

13. A computer program product comprising computer-executable instructions for storage on a non-transitory computer-readable storage medium when executed by a processor, cause user equipment to:
  detect an instruction for copying a picture stored at a first memory address;
  obtain a first exchange image file format (EXIF) information, wherein the first EXIF information is related to the first picture, and wherein the first EXIF information comprises first positioning information;
  modify the first positioning information in a preset manner to obtain a second picture, wherein the second picture comprising second EXIF information;
  modify the first positioning information in a preset manner to obtain second positioning information; and
  copy the second picture comprising the second positioning information,
  wherein after copying the second picture, the first picture remains stored at the first memory address.

14. The computer program product of claim 13, wherein the instructions further cause the user equipment to display optional geographical information corresponding to the first positioning information, and wherein modifying the first positioning information comprises replacing the first positioning information with optional geographical information based on a selection instruction input.

15. The computer program product of claim 13, wherein the instructions further cause the user equipment to:
  determine that there is preset configuration information; and
  modify the first positioning information based on the preset configuration information.

16. The computer program product of claim 15, wherein the instructions further cause the user equipment to:
  move a first location point corresponding to the first positioning information to a second location point along a direction based on a preset offset distance; and
  use geographical information corresponding to the second location point as the second positioning information.

17. The computer program product of claim 13, wherein the instructions further cause the user equipment to:
  display a local map comprising the first positioning information;
  receive user input selecting a location on the local map; and
  use geographical information corresponding to the location as the second positioning information.

18. The computer program product of claim 13, wherein the instructions further cause the user equipment to:
  receive geographical information from a user; and
  use the geographical information as the second positioning information.

19. The computer program product of claim 13, wherein the instructions further cause the user equipment to:
  obtain voice information from a user;
  identify geographical information in the voice information; and
  use the geographical information as the second positioning information.

20. The computer program product of claim 13, wherein and the first positioning information is any GPS location, and wherein the preset manner is deleting any GPS location of the first picture.

21. The computer program product of claim 13, wherein the second picture is stored at a second memory address, and wherein the method further comprises executing, using the second memory address, the instruction.

* * * * *

UNITED STATES PATENT AND TRADEMARK OFFICE
CERTIFICATE OF CORRECTION

PATENT NO. : 11,531,120 B2
APPLICATION NO. : 17/040769
DATED : December 20, 2022
INVENTOR(S) : Tiansong Xu It is certified that error appears in the above-identified patent and that said Letters Patent is hereby corrected as shown below:

In the Claims

Claim 1, Column 13, Line 56: "manner to obtain second" should read "manner into second"

Signed and Sealed this
Twenty-first Day of February, 2023

Katherine Kelly Vidal
Director of the United States Patent and Trademark Office